United States Patent

Sacher

(10) Patent No.: US 6,758,655 B2
(45) Date of Patent: Jul. 6, 2004

(54) PROCESS FOR DETERMINING A REFERENCE CHARACTERISTIC FOR CONTROLLING A PUMP

(75) Inventor: Manfred Sacher, Vienna (AT)

(73) Assignee: Pumpenfabrik Ernst Vogel Gesellschaft m.b.H., Stockerau (AT)

(*) Notice: Subject to any disclaimer, the term of this patent is extended or adjusted under 35 U.S.C. 154(b) by 0 days.

(21) Appl. No.: 10/211,208

(22) Filed: Aug. 2, 2002

(65) Prior Publication Data

US 2003/0039556 A1 Feb. 27, 2003

(30) Foreign Application Priority Data

Aug. 22, 2001  (EP) .......................................... 01890242

(51) Int. Cl.[7] .............................................. F04B 49/06
(52) U.S. Cl. .......................... 417/19; 417/20; 417/22; 700/282
(58) Field of Search ................... 417/18–20, 22–24, 417/44.1, 45, 44.2, 44.3, 44.11; 700/282, 38

(56) References Cited

U.S. PATENT DOCUMENTS 4,976,590 A * 12/1990 Baldwin ..................... 417/53
6,142,752 A * 11/2000 Akamatsu et al. .......... 623/3.1

FOREIGN PATENT DOCUMENTS

| DE | 3606751 A1 * | 9/1986 | .......... G05D/23/00 |
| DE | 37 24 756 | 8/1998 | |
| EP | 0 444 269 B1 | 9/1991 | |

* cited by examiner

*Primary Examiner*—Andrew M. Dolinar
(74) *Attorney, Agent, or Firm*—Merchant & Gould P.C.

(57) ABSTRACT

In the process according to the invention for determining a nominal values curve of an installation ($H_{installation}(Q)$, $P_{installation}(Q)$) for controlling the pump capacity of a pump (6) driven by an electric motor (10) with speed control in a closed system with variable capacity requirement, first all consumers in the installation are closed, one consumer operation parameter is determined at a consumer (4-n) arranged at a distance from the pump, the pump capacity is varied until the consumer operation parameter has reached a predetermined value, and, once this value has been reached, a pair of pump parameters representative for the instantaneous pump capacity is determined and stored in the controller. This measurement is repeated with different consumers being open, and from the stored values of the pairs of pump parameters the curve of nominal values ($H_{installation}(Q)$, $P_{installation}(Q)$) of the installation is calculated by way of a mathematical process for establishing a curve.

7 Claims, 2 Drawing Sheets

PROCESS FOR DETERMINING A REFERENCE CHARACTERISTIC FOR CONTROLLING A PUMP

The present invention relates to a process for determining a nominal value equipment curve of an installation for controlling the capacity of a pump actuated by an electric motor with speed control, by means of which pump a fluid is transported in said installation via predetermined conduits and consumers in an installation, the number and inside cross-sectional area of which are variable, in which controlling process a physical variable representative for the capacity of the pump is detected and an electrical signal proportional to this physical value is input in a controller as an actual value, the controller controlling the rotational speed of the electric motor and thus the pump capacity on the basis of the curve of nominal values of the installation.

Figure 1:
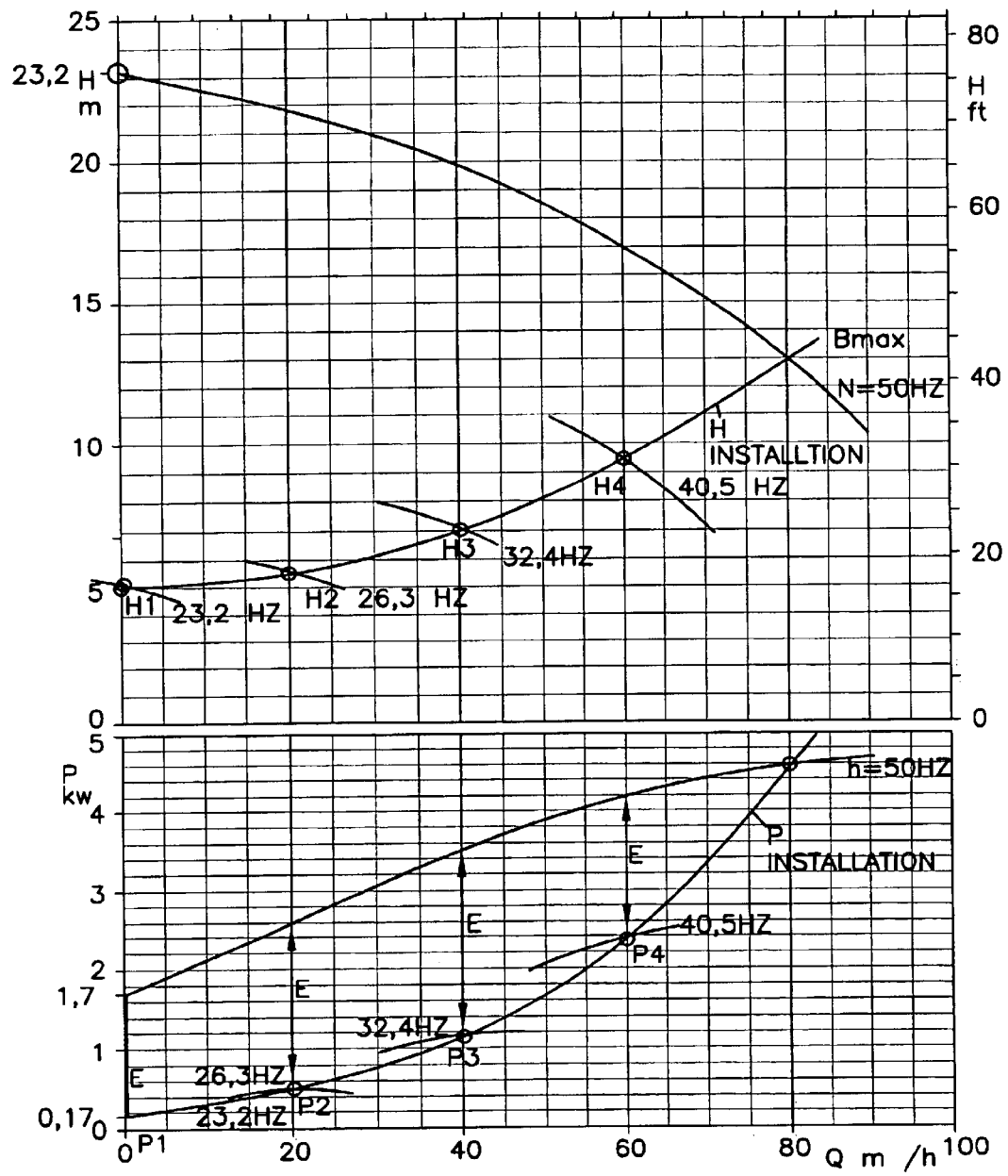

Pumps actuated by an electric motor, in particular rotary or centrifugal pumps, are frequently used in installations wherein the pump capacity demanded by the installation changes with time. This is for instance the case with pumps in heating installations. Here, maximum capacity is only required if all consumers are connected. In practical operation, however, the consumers, for instance individual heaters, are operated at reduced level only or are completely disconnected at certain times, which may result in completely different operating conditions with different capacity requirements variable with time. However, the maximum capacity of the pump in such an installation always has to be set so that all consumers within the installation can be supplied sufficiently even if all of them are connected at maximum consumption at the same time. If the pump is operated at full capacity all the time, i.e. also at reduced capacity requirements, the capacity of the machine will—unnecessarily—be raised beyond the level required. This behavior is illustrated with reference to a rotary fluid pump in the upper part of the graph of FIG. 1, showing a family of characteristic curves of the rotary pump, i.e. the pumping head H as a function of the capacity Q at a certain rotational speed n. This graph only shows the characteristic curve of the pump for its rotational speed of n=50 Hz in its entirety, other characteristic curves of the pump for n=40.5 Hz, n=32.4 Hz, n=26.3 Hz, and n=23.2 Hz are only shown as curve portions.

Dimensioning of the required capacity of such a rotary pump in an installation results from setting an operation value Bmax, which is the point of intersection of a demanded maximum volume pumped Qmax (in this example 80 m³/h), when all consumers are fully connected, and the pumping head H required for smooth operation of the installation (in this example 13 m). The characteristic pump curve intersecting this operating point Bmax (in this example the curve for n=50 Hz) gives the maximum rotational speed of the pump necessary for maintaining the required pumping head at 100% consumption (=Qmax). But if the actual consumption within the installation decreases and the pump continues to be operated at the same rotational speed n=50 Hz, the pumping head H rises, i.e. the instantaneous point of operation rises toward the left along the characteristic pump curve. Thus it can be seen that operating an installation in this way is highly uneconomical. In addition there may be disturbing noise resulting from flow if the output is considerably higher than that actually needed in the installation.

In order to improve a pump's energy consumption and its noise level, it is known to control the pump output (=pumping head×volume pumped) of a rotary pump in such a way that a constant pumping head results at the pump outlet regardless of the respective volume pumped, which pumping head may be measured by means of a pressure sensor and fed to a controller as an actual value.

However, controlling at a constant pumping head in such a way does not take into consideration the actual conditions within the installation. In particular, it does not take into consideration the inevitable pressure drops within the circuit system and the consumers connected thereto.

In order to improve control of the pump of such an installation it is thus necessary to define a curve of nominal values for the installation, taking into consideration the installation losses as a function of the volume pumped at least to a certain extent.

The controlling behavior of such an installation with a variable curve of nominal values therefor is shown in the graph of FIG. 1, once as the curve of nominal values for the installation $H_{installation}(Q)$ in the graph of pumping head versus amount pumped, and again as the curve of nominal values for the installation $P_{installation}(Q)$ in the graph of power uptake versus amount pumped. Both curves of nominal values for the installation are approximately parabolic in shape, but they have different slopes.

The graph of power uptake versus amount pumped also includes the respective energy savings with a pump control employing the given characteristic curve of nominal values for the installation as compared to operation of the pump at a constant rotational speed of n=50 Hz.

In practical operation, however, there is the problem of how to obtain an appropriate characteristic curve of nominal values for the installation. It is known to establish such curves of nominal values for an installation in tabular form by means of conduction and consumer ratings, or to define loss curves as mathematical functions. Both processes are theoretical approaches with which it is not possible to take into consideration the actual conditions within the installation, for instance a reduction of the cross-section of the conduit due to clogging or calcification, leaks of the installation, eddying because of bends or pronounced turns of the conduits. Thus many pumping systems also offer an operator the possibility to manually input tables of nominal values in a controller, which values have been fixed on the basis of experience or previous measurements of the installation (see e.g. DE-OS 37 04 756). It can easily be seen, however, that in all the above processes, the conditions within the installation are not taken into consideration to a sufficient extent.

European Patent No. 0,444,269 discloses regulating the power output of a pump which is driven by a speed-regulated electric motor in a closed system comprising conduits and consumers by first, during a calibration process for some arbitrary initial state of the system, recording, at least step-wise, the electrical signal from a probe detecting the rate of fluid flow at a plurality of points using particular settings of the pumping power and the appertaining percentage rates of flow of the fluid, from the static state of the pump up to 100% power output thereof, which corresponds to a 100% rate of flow, and supplying this respective signal as measurement value to a computer which produces a characteristic curve passing through each of the test values delivered by the probe, regulation of the output of the pump by the computer initially being in correspondence with this characteristic curve as long as it is within the limits set by the calibration process, until such time as, due to changes in the system, a greater rate of flow of the fluid occurs than for a 100% power output of the pump during the calibration process, whereupon the computer defines the highest value of the rate of flow as a new test value for a 100% power output of the pump on an extension of the characteristic curve, and the computer displaces each of the percentage values of the rate of flow along the characteristic curve by an amount which corresponds proportionately to the ratio of the new highest rate of flow to the preceding one, while an adaptation of the characteristic curve is effected in a manner analogous thereto by the computer whenever a further increase in the rate of flow occurs.

The present invention provides a process for determining a curve of nominal values for an installation with which the above disadvantages of the prior art will be avoided and which does justice to the actual conditions of the installation.

The process according to the invention comprises the following steps:

a) closing all consumers in the installation, b) detecting a consumer operation parameter at a consumer at a distance from the pump, preferably at the consumer positioned at the greatest distance from the pump, which parameter is representative for the operability of this consumer, and varying the instantaneous pump capacity until the consumer operation parameter has reached a predetermined value, c) transmitting a confirmation signal to the controller as soon as the consumer operation parameter has reached the predetermined value, d) upon receipt of the confirmation signal, determining the instantaneous value of a pair of pump parameters representative for the instantaneous capacity of the pump, and storing this value in the controller, e) opening one or several consumers and repeating the above process steps b) through d), and f) calculating a function by way of a mathematical process for establishing a curve from the stored values of the pump parameter pairs, and storing this function as curve of nominal values for the installation in the controller.

The curve thus calculated does not necessarily have to pass through all parameter pairs determined, but for an optimized curve path may also run therebetween.

Preferably the consumer operation parameter is determined at the consumer at the greatest distance from the pump as it may be assumed that the value of this parameter is minimal for the last consumer because of the losses within the circuits, so that if the adjustment is correct for the consumer at the greatest distance, all other consumers in the system will be supplied to a sufficient extent as well. If, however, the interrelationship between the values of the consumer operation parameter for the consumer at the greatest distance and the values for another consumer is known from empirical experiments or calculations, this other consumer may be used for carrying out the process as well, the known interrelationship having to be considered accordingly.

Transmission of a confirmation signal to the controller as soon as the consumer operation parameter has reached the predetermined value can preferably take place in automated fashion, for instance via remote data transmission. In a simple variant the transmission of the confirmation signal may, however, also be done manually, for example by contact between two operators, one of whom has access to the controller, while the other one has his post at the remote consumer.

In order to achieve maximum precision of the curve of nominal values for the installation process step e) is advantageously carried out several times, but in any case at least twice.

Preferably the consumer operation parameter is a pressure differential between the inlet and the outlet of the consumer at the greatest distance, as such a pressure differential may easily be determined by temporarily connecting a pressure differential sensor to the inlet and the outlet of the consumer.

Preferably the pair of pump parameters comprises the amount pumped and the electrical power taken up by the pump driving motor, and is detected by measuring two parameters from among the amount pumped, the electrical power taken up by the pump driving motor and the rotational speed of the pump, as the case may be optionally by calculating the missing parameter from the mathematical interrelationships between these three parameters. For it is possible to give a family of curves representing a characteristic progression of the uptake of electrical power by the pump driving motor for any rotational speed of the pump as a function of the volume pumped. As it is possible to integrate the measurement of the rotational speed and of the power uptake into a pump control apparatus or a frequency converter, it is thus possible to obtain a pump controlling apparatus the construction of which is superior in its operational reliability and cost-effectiveness.

An alternative preferred embodiment of the process according to the invention is characterized in that the pair of pump parameters comprises the volume pumped and the pumping head and is determined by measuring two parameters from among the amount pumped, the pumping head and the rotational speed of the pump, optionally by calculating the missing parameter from the mathematical interrelationships between these three parameters. For it is also possible to give a family of curves representing a characteristic course of the pumping head as a function of the volume pumped. As the measurement of the rotational speed may be integrated into a pump controller or a frequency converter, and as the pumping head may be determined by means of a pressure differential sensor between pump outlet and pump inlet, this embodiment enables the provision of a pump controller the construction of which is of superior operational reliability.

In order to explain the invention in more detail, embodiments thereof while now be described with reference to the accompanying drawings. In the drawings, FIG. 1 shows graphs of a family of characteristic curves of a pump, i.e. pumping head as a function of the amount pumped and the rotational speed of the pump, and a family of characteristic curves of power uptake by the pump motor as a function of the volume pumped and the rotational speed.

Figure 2:
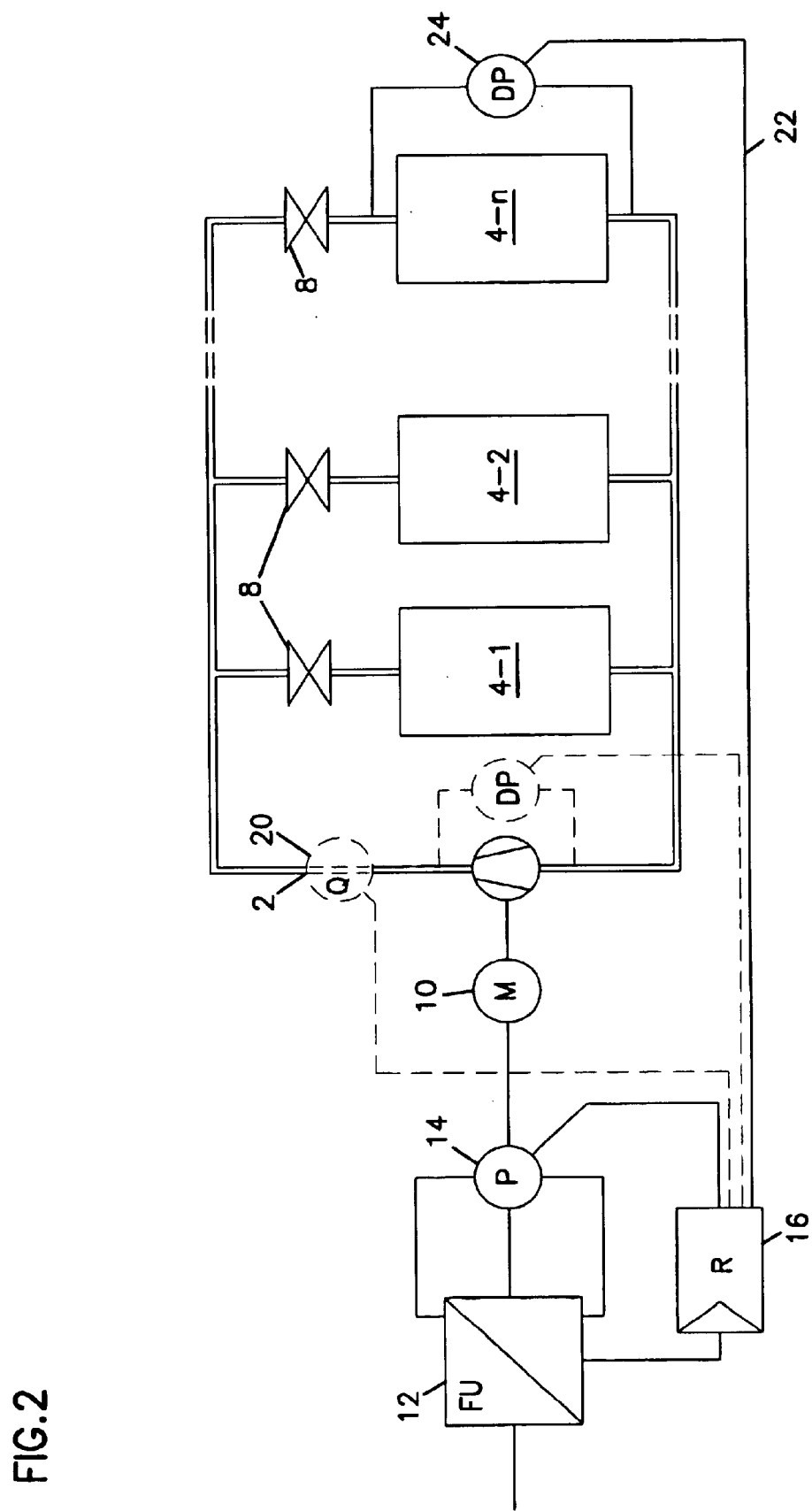

FIG. 2 is a diagrammatic representation of a heating installation having a heating pump and an arrangement according to the invention for determining a curve of nominal values for the installation.

Referring to FIG. 1 first, it shows a graph of the pumping head versus the volume pumped as well as a graph of the power uptake versus the volume pumped for a rotary pump. As already mentioned, there is a characteristic curve of the uptake of electrical power by an electric motor driving the rotary pump as a function of the volume pumped by the rotary pump for any rotational speed thereof, and there is a characteristic curve of the pumping head as a function of the volume pumped by the rotary pump, so that both graphs actually comprise families of curves of discrete curves for the various rotational speeds of the pump. FIG. 1 shows the power uptake curve ("characteristic power curves") and the pumping head curve ("characteristic pump curves") versus the volume pumped for a rotational speed of the pump of n=50 Hz in its entirety; for other characteristics power curves and characteristics pump curves for rotational speeds of n=23.2 Hz, n=26.3 Hz, n=32.4 Hz, n=40.5 Hz only those portions of interest are shown. Furthermore these graphs already include the required curve of nominal values for the installation with $P_{installation}(Q)$ of the power uptake by the motor as a function of the volume pumped by the pump, and with $H_{installation}(Q)$ of the pumping head as a function of the volume pumped, respectively, which in both cases are determined by parameters of the installation as a whole.

In the following it will be explained how to obtain the required curves of nominal values for the installation $P_{installation}(Q)$ and $H_{installation}(Q)$, respectively.

First, all consumers in the installation are closed, and a pressure differential sensor is connected to the consumer positioned at the greatest distance from the pump. This pressure differential has to reach or exceed a predetermined value, so that its functioning can be ensured in normal operation, e.g. in case the consumer is a heater, so as to ensure that heating medium flows therethrough in a sufficient amount and at a sufficient speed. Then the instantaneous pump capacity is varied until the pressure differential at said consumer takes the predetermined value. That this value has been reached will be manually or automatically signalled to a controller. Upon receipt of the confirmation signal the controller is prompted to determine the instantaneous values of a pair of pump parameters representative for the instantaneous pump capacity and to store these values. In the illustrated embodiments the pair of pump parameters in one case comprises the pumping head and the amount pumped, and in another case comprises the electrical power taken up by the pump driving motor and the amount pumped. Preferably, in the first case the pair of values are determined by measuring the rotational speed of the pump and the electrical power taken up, from which the amount pumped may be calculated on the basis of the respective characteristic power curve, which may be stored in the controller in a characteristic diagram, for instance. The parameter pair thus determined is plotted as point P1 in the power graph. In the second case, the rotational speed of the pump and the pumping head are measured (the latter by way of measuring the pressure differential), and the amount pumped is determined on the basis of the respective characteristic pump curve, giving a point H1.

When this first measurement has been completed, one or a plurality of consumers is/are opened, and the above measurement procedure is repeated. This procedure is a again repeated several times for different numbers of open consumers, respectively, which in the first case gives a series of measurement values at points P1 through P4, and in the second case a series of points H1 through H4.

From the values of pump parameters stored (points P1–P4 and H1–H4, respectively), a function is now calculated in the controller by means of a computer using known mathematical processes for establishing curves (formation of compensating curves, etc.), and this mathematical function is stored in the controller as curve of nominal values for the installation $P_{installation}(Q)$ and $H_{installation}(Q)$, respectively, where it will now be available for controlling the rotational speed of the pump as a function of the volume pumped instantaneously.

FIG. 2 schematically shows an example for a practical embodiment of the invention. It is a heating installation having a rotary pump 6 and an arrangement according to the invention for controlling the rotational speed of this rotary pump. Liquid heating medium is pumped to heaters 4-1, 4-2 . . . 4-n and back to the pump via a conduit system 2, heaters 4-1, 4-2 . . . 4-n being individually controllable by flow control valves 8, so that depending on the position of these flow control valves, circulation in the heating circuit and thus the amount pumped by the rotary pump 6 may change.

Pump 6 is driven by a three-phase current motor 10, the rotational speed of which may be controlled. In this example, controlling of the rotational speed is effected by a frequency converter 12. A power measuring device 14 is arranged in the electrical interconnection between frequency converter 12 and three-phase current motor 10, which device measures the uptake of electrical power by motor 10 and provides a signal representative of the power uptake, as for instance a direct voltage. A frequency converter with integrated measurement of the uptake of electrical power and an appropriate signal output may optionally be used for this purpose as well. Furthermore it would also be possible to measure the uptake of electrical power upstream of the frequency converter, as the power consumption by the frequency converter has hardly any influence on controlling as compared to that by the motor. The power signal output of the power measurement device 14 is connected to the input of a controller 16. The output of controller 16, which provides an output value determining the required rotational speed as described above, e.g. a direct voltage between 0 and 10 V or a direct current between 4 and 20 mA, is connected to the controlling input of the frequency converter 12. The characteristic curve for control by controller 16 is function $P_{installation}(Q)$ as detailed above, and it is defined as a mathematical function within the controller. Controller 16 preferably is a digital controlling device using a microprocessor.

A pressure differential sensor 24 is temporarily connected to the supply and discharge of the heater 4-n at the greatest distance from pump 6, so as to determine the curve of nominal values for the installation. If the pressure differential exceeds a preset value, confirmation is transmitted to controller 16; this is symbolized by transmission line 22, and it is noted that the type of this transmission line is not restricted in any way. It may be a wire or wireless line for transmitting analogous or digital signals. In case the process for determining the curve of nominal values for the installation is not carried out in an automated way, it is also conceivable that an operator positioned at the controller 16 receives instructions from a second operator positioned at the pressure differential sensor 24, inputting the confirmation signal in the controller 16 manually according to these instructions.

In order to demonstrate that apart from controlling the rotational speed of the pump by measuring the electrical power taken up by the pump motor as a feedback value, it is also possible to use other controlling procedures, for instance one where the pressure differential is measured as a feedback value, FIG. 2 shows a pressure differential sensor 18 connected between the outlet and the inlet of the pump in broken lines. In order to furthermore show that the amount pumped may also be measured directly, a corresponding device 20 for measuring the amounts pumped is shown in broken lines as well.

What is claimed is:

1. A process for determining a nominal value curve of an installation ($H_{installation}(Q)$, $P_{installation}(Q)$) for controlling the pump capacity of a pump (6) driven by an electric motor (1) with speed control, by means of which pump a fluid is transported through predetermined conduits (2) and consumers (4-1, 4-2, 4-n) in an installation, the number and inside cross-sectional area of which are variable, wherein a physical variable representative for the capacity of the pump is detected by means of a sensor (14, 18, 20) and an electrical signal proportional to this physical value is input in a controller (16) as an actual value, the controller controlling the rotational speed of the electric motor and thus the capacity pump (6) on the basis of the curve of nominal values ($H_{installation}(Q)$, $P_{installation}(Q)$) of the installation, comprising the steps of:

a) closing all consumers in the installation, b) detecting a consumer operation parameter at a consumer at a distance from the pump, preferably at the consumer (4-n) positioned at the greatest distance from the pump, which parameter is representative for the operability of this consumer, and varying the instantaneous pump capacity until the consumer operation parameter has reached a predetermined value, c) transmitting a confirmation signal to the controller (16) as soon as the consumer operation parameter has reached the predetermined value, d) upon receipt of the confirmation signal, determining the instantaneous value of a pair of pump parameters representative for the instantaneous capacity of the pump, and storing this value in the controller (16), e) opening one or several consumers and repeating the above process steps b) through d), and f) calculating a function by way of a mathematical process for establishing a curve from the stored values of the pump parameter pairs, and storing this function as a curve of nominal values ($H_{installation}(Q)$, $P_{installation}(Q)$) for the installation of the controller (16).

2. The process according to claim 1, wherein process step e) is carried out at least two successive times.

3. The process according to claim 1, wherein the consumer operation parameter is a pressure differential between the inlet and the outlet of the consumer (4-n).

4. The process according to claim 1, wherein the pair of pump parameters comprises the amount pumped (Q) and the electrical power (P) taken up by the pump driving motor (10), and that is determined by measuring two parameters from among the amount pumped (Q), the electrical power (P) taken up by the pump driving motor (10) and the rotational speed (n) of the pump.

5. The process according to claim 1, characterized in that the pair of pump parameters comprises the amount pumped (Q) and the pumping head (H) and is determined by measuring two parameters from among the amount pumped (Q), the pumping head (H) and the rotational speed (n) of the pump.

6. The process according to claim 4, wherein an unknown parameter of the pair of pump parameters is calculated based upon the mathematical interrelationships between the three parameters of the amount pumped (Q), the electrical power (P) taken up by the pump driving motor (10), and the rotational speed (n) of the pump.

7. The process according to claim 5, wherein an unknown parameter of the pair of pump parameters is calculated based upon the mathematical interrelationships between the three parameters of the amount pumped (Q), the pumping head (H) and the rotational speed (n) of the pump.

* * * * *